May 27, 1924.  
J. G. GONGOPOLOS  
THEFT ALARM FOR STEERING LOCKS  
Original Filed May 11, 1921  
1,495,684
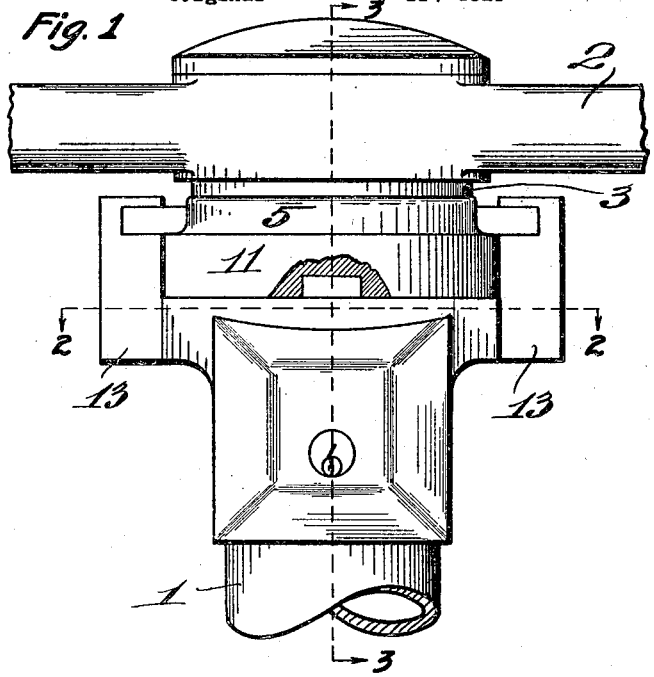
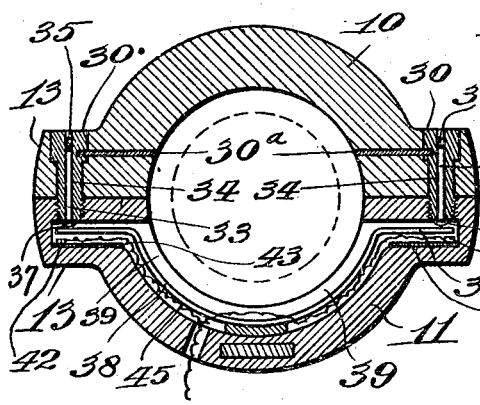
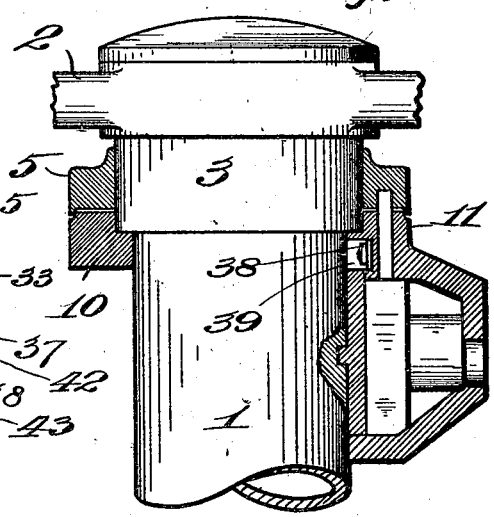
Inventor  
JOHN G. GONGOPOLOS  
By Hazard & Miller  
Attys.

Patented May 27, 1924.

1,495,684

UNITED STATES PATENT OFFICE.

JOHN G. GONGOPOLOS, OF SANTA BARBARA, CALIFORNIA, ASSIGNOR OF ONE-HALF TO GEORGE GALLANIS, OF SANTA BARBARA, CALIFORNIA.

THEFT ALARM FOR STEERING LOCKS.

Original application filed May 11, 1921, Serial No. 468,774. Divided and this application filed April 15, 1922. Serial No. 553,218.

*To all whom it may concern:*

Be it known that I, JOHN G. GONGOPOLOS, a citizen of the United States, residing at Santa Barbara, in the county of Santa Barbara and State of California, have invented new and useful Improvements in Theft Alarms for Steering Locks, of which the following is a specification.

This invention relates to theft signals and more particularly to a signal device for giving an alarm when a lock controlling a steering wheel is being tampered with.

An object of the present invention is to provide a very simple, substantial and compact means for giving an audible alarm and which is adapted to be arranged in combination with certain elements of a steering wheel lock, particularly of the type shown in my application filed May 11, 1921, Serial No. 468,774, of which this application is a division; the lock structure disclosed in the present case not being herein claimed.

One embodiment of the invention is herein described and illustrated in the accompanying drawings, in which—

Figure 1 is a fragmentary side elevation of a portion of a steering wheel and steering column with which the theft signal is associated.

Fig. 2 is a section on line 2—2 of Fig. 1.

Fig. 3 is a side elevation and partial section of the lock with which the invention is combined, the section taken on the line 3—3 of Fig. 1.

The lock mechanism with which the present signal is combined is arranged upon a steering column 1 upon which is mounted the usual steering wheel 2 having a steering collar 3 and which consists of semi-circular sections indicated at 5, these being suitably secured together.

A lock mechanism is provided and consists of sections 10 and 11 forming an annulus surrounding the column 1. The sections are provided with diametrically opposite lugs or ears 13 through which are passed fastening screws 30 which have countersunk heads provided with grooves to receive a screw driver or the like for turning the screws.

While the screws are fastened in their applied position in their respective lugs 13 by pins 30ª driven outwardly from the interior of the ring section 10, it is preferred that means be provided for giving an audible signal when any attempt is made to remove the screws 30.

The present invention therefore consists essentially in means for giving such signal. In this case the screws 30 are provided with axial apertures 34, and slidably mounted therein are pins 33 having cross heads 35 which normally stand out in the diametrical slots extending across the heads of the screws. The inner ends of the pins are provided with heads 37, and a spring arm 38 of segmental form is mounted in a groove 39 which extends around the inner face of one section of the lock structure, as in the section 11. The ends of the spring member 38 normally spring out against the heads 37 of the pins 33 and hold these with their cross heads in outermost position which is limited by the inner heads 37 of the pins.

The ends of the spring form contact elements normally spaced from fixed contacts 42 which are mounted upon insulating blocks 43 in the outer ends of the groove 39. Thus, if a screw driver or other tool is inserted in the grooves 32 of the heads of the screws 30, the pins 33 will be pushed inwardly and therefore close the contact members 38 and 42. The contacts 42 are connected by a wire 45 arranged in groove 39 and is led to a suitable signalling device as a bell which is not herein shown. One element of the circuit may include the metallic parts, as a ground, so that when co-operative contacts 38 and 42 are engaged the circuit will be closed and an alarm sounded.

Various changes and modifications may be made without departing from the spirit of the invention as claimed.

What is claimed is:

1. In combination with separable collar parts which are secured to each other by screws or the like, means for giving a signal when an attempt is made to remove the fastening screws, said means comprising normally separated contact members associated with said parts and forming elements of an electric circuit, and rods arranged in said screws and operative to close the circuit at the contact parts when a tool is applied to a screw to remove the same, the circuit elements including the contacts being arranged within and concealed and protected by one of the separable parts.

2. In combination with separable parts which are fastened by screws or the like and which screws have screw driver slots in their heads, signal means for giving an alarm when a tool is applied to either of the screws for removing the same, said device comprising electrical circuit elements including normally separated contact members, and rods arranged in the screws and having heads fitting in the slots in the screw whereby when a screw driver or other tool is applied to the slots to turn the screw the contacts will be engaged to complete an electric circuit.

3. A pair of collar parts adapted to be secured together by screws or the like around a steering column, one of said parts being provided with an interior recess, a yieldable contact member arranged in said recess and having portions extending contiguous to the fastening screws, fixed contacts adjacent said portions to be engaged thereby, and rods arranged in the screws so that when the latter are applied and a tool is used in the head of the screw to turn the same said means closes the contacts to complete a signal circuit.

In testimony whereof I have signed my name to this specification.

JOHN G. GONGOPOLOS.